United States Patent

Wlassics et al.

(10) Patent No.: US 6,191,314 B1
(45) Date of Patent: Feb. 20, 2001

(54) PROCESS FOR OBTAINING (PER) FLUOROPOLYETHERS SUBSTITUTED AT ONE OR AT BOTH END GROUPS WITH A HALOGEN ATOM

(75) Inventors: Ivan Wlassics, Genoa; Vito Tortelli, Milan, both of (IT)

(73) Assignee: Ausimont S.p.A., Milan (IT)

( * ) Notice: Under 35 U.S.C. 154(b), the term of this patent shall be extended for 0 days.

(21) Appl. No.: 09/328,446

(22) Filed: Jun. 9, 1999

(30) Foreign Application Priority Data

Jun. 11, 1998 (IT) .............................. MI98A1326

(51) Int. Cl.$^7$ .................... C07C 43/11; C07C 59/135
(52) U.S. Cl. ................ 568/614; 568/615; 562/586; 562/587; 562/588
(58) Field of Search ................. 568/615, 614, 568/586, 587, 588

(56) References Cited

U.S. PATENT DOCUMENTS 5,026,786 * 6/1991 Marchionni et al. ............ 525/356
5,455,373 10/1995 Kawa ............................... 560/300

FOREIGN PATENT DOCUMENTS 0 348 948 A2 6/1989 (EP) .................... C08G/65/00
0 803 526 A2 4/1997 (EP) .................... C08G/65/00

* cited by examiner

*Primary Examiner*—Rosalynd Keys
(74) *Attorney, Agent, or Firm*—Arent, Fox Kintner Plotkin & Kahn

(57) ABSTRACT

A process for obtaining (per) fluoropolyethers substituted at one or at both end groups with a halogen atom selected from bromine or iodine, having the formula:

$$A-CF_2-O-(CF_2CF_2O)_p-(CF_2O)_q-CF_2-B \quad (III)$$

wherein

A=B=halogen; or A=halogen and B=COOH or F, and the halogen is I or Br;

p and q are integers such as to give a number average molecular weight (MW) in the range 350–5000 and the ratio p/q=0.5–2.0.

The process includes treating di- or poly-acylperoxides having an average equivalent weight in the range 350–5000, of formula:

$$T-CF_2-O-[(CF_2CF_2O)_p-(CF_2O)_q-CF_2-CO-O-O-CO-CF_2-(OCF_2)_q-(OCF_2CF_2)_p]_y-OCF_2-COOH \quad (II)$$

with a halogen selected from iodine or bromine, in a polyhalogenated organic solvent, at temperatures between 20° and 80° C.

12 Claims, No Drawings

PROCESS FOR OBTAINING (PER) FLUOROPOLYETHERS SUBSTITUTED AT ONE OR AT BOTH END GROUPS WITH A HALOGEN ATOM

The present invention relates to a process for obtaining (per)fluoropolyethers (Z-PFPE) substitued at one or both end groups with a halogen atom selected between bromine or iodine. The obtained (per)fluoropolyethers have the structure

wherein

A=B=halogen; or A=halogen and B=COOH or F, and halogen=I, Br;

p and q are integers such as to give number average molecular weight (MW) in the range 350–5000 and p/q=0.5–2.0.

These compounds are obtained through an industrial process using mild reaction conditions, inexpensive reactants and having improved halogenated product yields.

More specifically the present invention relates to a process to obtain di-iodinated alpha, omega (per) fluoropolyethers (Z-PFPE) having the structure

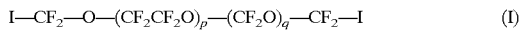

wherein p and q are integers to give molecular weight (MW) by number in the range 350–5000 and p/q=0.5–2.0.

Reactions allowing for the introduction of a halogen atom in the perfluoropolyether end groups starting from the corresponding carboxylic acids or derivatives thereof are known in the art.

EP 348,948 describes a process for obtaining perfluoropolyether mixtures having at one or at both chain ends an iodine atom, wherein a perfluoropolyether mono- or diacylfluoride is reacted with iodine in the presence of at least a salt selected from the alkaline and earth-alkaline metal carbonates, in a perhalogenated solvent having a boiling point in the range 180°–260° C. The reaction occurs at high temperatures and is triggered by carbonate decomposition. By operating at these high temperatures iodine tends to sublimate and its concentration in the solvent decreases. Moreover the sublimated iodine which solidifies can obstruct the reactor. In order to overcome these drawbacks with the above solvents which at the reaction temperatures are in reflux conditions and maintain the iodine in solution as described in the cited '948 reference are used. The yields are high using the acid halide. Tests carried out by the Applicant have shown that the process is not applicable to Z-PFPE: the main reaction is of decomposition ("zipping") of the perfluoropolyether chain with $COF_2$ release. The iodinated Z-PFPE yields are very low, lower than 5%, the product is essentially monoiodinated. Moreover the molecular weight is much lower than the precursor. The separation of the mixture is extremely difficult and in any case the '948 does not give any indication about the Z-PFPE separation method. The separation method indicated in the examples is not applicable to the iodinated Z-PFPEs.

U.S. Pat. No. 5,455,373 relates to a method to obtain mono- and dibromo perfluoroalkane derivatives by treating the corresponding mono- and bicarboxylic acids with bromine in the presence of fluorine. Monoiodides are likewise synthetized with very low yields.

In EP 803,526 in the name of the Applicant a method to obtain Z-PFPE type perfluoropolyethers with brominated or iodinated end groups is described. The method consists of subjecting a peroxidic perfluoropolyether to thermal treatment in absence of UV radiations at temperatures in the range 120°–280° C. in the presence of brominated or iodinated compounds such as $CBr_4$, $CHBr_3$, $CHI_3$, $CH_2I_2$. The iodinated or brominated end groups starting from Z-PFPE peroxides are of the type: $—CF_2—CF_2I$, $—CF_2I$, $—CF_2—CF_2Br$, $—CF_2Br$. No separation method of these kinds of di-iodinated derivatives is indicated. In this patent a thermal treatment at high temperatures and expensive iodinated/brominated reactants are used.

The need was felt to have available a process for preparing di-iodinated derivatives having a Z-PFPE structure with an industrial process using less severe conditions and less expensive reactants and having improved di-iodinated product yields.

An object of the invention is therefore a process to obtain (per)floropolyethers (Z-PFPE) substituted at one or both end groups with a halogen atom selected between bromine or iodine, having the formula:

wherein

A=B=halogen; or A=halogen and B=COOH or F, and halogen=I or Br;

p and q are integers such as to give number average molecular weight (mw) in the range 350–5000 and p/q=0.5–2.0, consisting in treating, with a halogen selected between iodine or bromine, in a polyhalaogenated organic solvent, at temperatures in the range 20°–80° C., preferably 30°–50° C., di- or poly-acylperoxides having average equivalent weight in the range 350–5000, of formula:

wherein:

y is an integer in the range 1–5;

p and q are integers such as to give the indicated EW of formula (II) and p/q=0.5–2.0;

T=COOH or F with the proviso that when T=COOH y=1–5, and when T=F then y=1.

The diacyl peroxides of formula (II) are obtained by starting from perfluoroether acylhalides having average molecular weights (MW) by number in the range 350–5000, and having the formula:

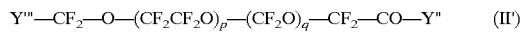

wherein

Y"=Cl, F;

Y'"=CO—Y", F;

by reacting them with $H_2O_2$ in a basic environment. A preferred process for obtaining the diacylperoxides of formula (II) is carried out at a temperature in the range −5° C.–+5° C. in a mixture formed by two immiscible liquid phases having a total volume equal to at most ⅔ of that of the reactor, kept under stirring so that no emulsions are formed, said liquid phases being the following:

an organic phase formed by a polyhalogenated solvent having very low ODP, in an higher amount, an aqueous alkaline solution containing an excess of hydrogen peroxide with respect to the added halide;

said process comprising the following steps:

a) addition of the (per)fluoropolyether acyl-halide of formula (II') by cooling so that the ΔT thermal increase, with reference to a reactor having an internal volume in the range 50–250 ml cooled by a 2 l volume cryogenic bath having a temperature comprised between −40° C. and −80° C., is in the range 6° C.–20° C. and when the addition is over, the temperature decreases to the initial one in a time in the range 0.1–5 minutes;

b) reacting, at the initial temperature, for the necessary time ($t_{max}$) to obtain the 75% conversion of the acyl-halide (II'), determined by quantitative FTIR analysis;

c) reaction interruption, by stopping stirring and allowing the phases to be separated by maintaining the system at the initial temperature, and recovery of the organic phase containing the perfluoropolyether acyl-peroxides of formula (II).

The polyhalogenated solvents can be the same as those of the present invention.

Preferably in step a) the ratio between the alkali moles with respect to the —CO—Y" functional group equivalents is in the range 1.2–1.8 and the ratio between the aqueous phase ml volume and the base grams is in the range 5–10; preferably the organic phase volume is half than that of the reactor.

This process to obtain peroxides has been described in a Patent Application in the name of the Applicant filed on the same day as the present invention and herein incorporated by reference (Italian Patent Application MI98A001328); corresponding U.S. application Ser. No. 09/328,399, having the title: perfluoropolyether acylperoxides and process for their preparation.

The reaction time to prepare the halogenated compounds of formula (III) of the present invention is generally comprised from 1 minute to 24 hours, preferably from 1 to 3 hours. Specifically the temperatures and the reaction time are related to the equivalent weight of the starting peroxide.

In particular, when the peroxides of formula (II) have equivalent weights in the range 350–4000, the temperature is in the range 20°–55° C. and the reaction time ranges from 4 minutes to 10 hours.

Examples of polyhalogenated organic solvents used in the reaction according to the present invention are perfluoropolyethers having a low molecular weight, preferably in the range 400–1000, more preferably 600–800, having perfluoroalkyl end groups, each optionally containing, independently the one from the other, a hydrogen atom; perfluoroalkanes, preferably having a $C_6$–$C_{10}$ linear chain or mixtures thereof. The ratio between halogen and peroxide, expressed as ratio between the I or Br species moles and the peroxide moles, can range from 2:1 to 5:1, preferably from 2:1 to 3:1.

The method object of the present invention allows one to obtain, with improved yields, mono- or di-halogen derivatives mixtures of formula (III) having number average molecular weights in the range 350–5000, preferably 500–2000.

Starting from the Z-PFPEs of formula(II) having an EW in the range 350–3000, and reacting with iodine according to the above described reaction, perfluoropolyether mixtures having one or both end groups substituted with an halogen atom, are obtained.

From the obtained mixtures it is possible to separate the di-halogen derivatives in the pure state by silica gel chromatography or other stationary phase capable to retain the products having acid end groups (see the Examples).

More specifically, as said, the present invention, relates to a process to obtain alpha, omega di-iodinated (per) fluoropolyethers (Z-PFPE) having the formula:

wherein p and q are integers such as to give molecular weight (MW) in the indicated range 350–5000 and p/q= 0.5–2.0, by treating with iodine at the above mentioned temperatures compounds of formula (II) wherein y>1 and preferably it is equal to 5. Under these conditions the highest yield of di-iodides with a purity greater than 95% is obtained. The obtained di-iodinated product is in admixture with acid products which can be separated by chromatography as above indicated. The end groups are exclusively of the —$OCF_2I$ type.

The iodinated products of formula (I) are new products.

It has been found that the iodinated derivatives of the invention maintain the equivalent weight of the starting acylperoxide. In practice no substantial zipping effect takes place, i.e. of iodinated product molecular weight decrease with respect to the starting product equivalent weight.

The introduction of end groups containing a halogen atom of the invention type in perfluoropolyethers Z-PFPE allows one to directly use these products in the fluoroelastomer and plastomer polymerization as chain transfer agents (halogenderivatives) or as curing agents.

The following examples are given only for illustrative purposes without limiting the scope of the same.

EXAMPLE 1

Synthesis of a Diacyl- and Polyacyl-peroxides Mixture (Z-PFPE) EW 1355

The equipment consists of a 200 ml glass flask with 4 ground necks, equipped with mechanical blade stirrer, condenser, dropping funnel and thermometer. The equipment is assembled so that the flask can be dipped in a refrigerant bath.

In the flask, at room temperature, 87.3 mmoles of finely milled NaOH are dissolved in 23.5 ml of distilled $H_2O$ (equivalent to 6.75 ml $H_2O$/g NaOH); to this solution 35 mmoles of $H_2O_2$ at 57.5% w/w and 100 ml of $C_6F_{14}$ perfluorohexane are added. The solution is cooled at 0° C. under strong stirring (1512 rpm). In 15 seconds 29.1 mmoles of perfluoroether diacylchloride Z-PFPE of formula

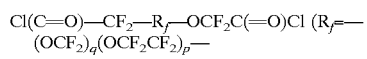

wherein p/q=0.5–2) PM 1374, are dropped. By dipping the reactor in a bath at −40° C. the reaction mixture exothermy does not exceed 9° C. When the exothermy is ended, the temperature returns to 0° C. in 1.5 minutes. Stirring is continued at 0° C. for a time $t_{max}$=1 minute so as to obtain the acylchloride 75% conversion (determined by FTIR analysis, peak at 1804 cm$^{-1}$). At this point stirring is stopped and the flask content is poured in a separatory funnel, previously cooled at 0° C. After phase separation the organic phase is recovered, which is anhydrified by sodium sulphate and filtered in a "Sartorius" pressure filter equipped only with prefilter. 167 g (density=1.72 g/ml) of clear organic solution having a peroxide titre of 0.28 g peroxide/ml solution, equivalent to 27.5 g of acyl peroxide having a calculated EW 1355. The yield, calculated by the equivalent weight is of 70%.

EXAMPLE 2

EXAMPLE 2A

General Iodination Process

Process to Obtain Perfluoropolyether Mixtures Having at One, or Both End Groups an Iodine Atom (—O—$CF_2I$)

The reaction is carried out by using the reactants in the ratios as mentioned hereinunder.

In a reactor 90 parts of $C_6F_{14}$ and 0.832 parts (3.28 mmoles) of bisublimated $I_2$ are introduced. The reactor is thermostated between 20 and 80° C. and the (per)fluoroacylperoxide is added in a meq amount such that the meq: iodine mmole ratio is 0.82:1. It is reacted for the time required in connection with the peroxide equivalent weight. The solution is filtered by using paper filter to eliminate the unreacted iodine.

EXAMPLE 2B
Separation of the Iodinated Products and Evaluation of the Reaction Yield The process to determine the amount of the components of the reaction mixture of Example 2A, and with the suitable substitutions in the formulas for the molecular weight calculation illustrated hereinafter, remains valid also for PFPE mixtures with —$CF_2Br$ end groups.

The reaction crude material of Example 2A must be in an amount of at least 5 grams.

The mass balance (M.B.) is defined as the ratio between the grams of the obtained (crude) material (the reaction product weight, together with that of, in case, of the unreacted peroxide) with respect to that of the starting product.

On the reaction mixture the $^{19}F$ NMR and FT—IR analyses are carried out to determine the percentages of —$OCF_2I$ —$OCF_2COOH$ end groups.

The organic phase is dried, weighed and passed through a silica gel column, dimensioned so that it contains a 18 ml gel volume (diameter 1.5 cm and heigth 10 cm) for an amount by weight of mixture to be fractionated equal to 5–10 g. It is eluted with a low boiling apolar solvent, for example $C_6F_{14}$, methylene chloride, etc. The elution total volume is 7 times the column volume.

The perfluoroethers having no acid end groups ($I^{st}$ fraction) are eluted with this solvent. In the column stationary phase the perfluoropolyethers having acid end groups are retained. The compounds eluted with the $I^{st}$ fraction are isolated by evaporation of the solvent and weighed. In the $^{19}F$ NMR spectrum a 9–10 ppm doublet, characteristic of the —OC—$F_2I$ end groups, is detectable, while peaks due to —COOH end groups are absent (peaks at 78.5–79.5 ppm).

The reaction, the fractionation process and the $^{19}F$-NMR analysis above described are also useful to determine qualitatively if in the peroxide synthesis according to the examples described hereinafter, a polyacylperoxide has been formed. The crude material of these reactions is treated with iodine and then fractionated by column as above described.

In order to recover the perfluoropolyether acid derivatives, the column silica gel is dispersed in an aqueous solution at 65% of acetic acid in the ratio 1 (silica gel): 5 (aqueous sol.) The acid aqueous phase is extracted with $C_6F_{14}$ ($II^{nd}$ fraction). The solvent is dried which is then removed by evaporation at a reduced pressure. The obtained acid perfluoropolyether is recovered and weighed. The $^{19}F$-NMR analysis is repeated. The peaks corresponding to the —$OCF_2I$ and —$OCF_2COOH$ end groups are to be present. The ratio between the area of the —$OCF_2I$ end group peak and the —$OCF_2I$ and —$OCF_2COOH$ peak area sum is caluclated obtaining the percentage of the monoiodinated PFPEs present in the mixture recovered from the column.

The $^{19}F$-NMR analysis on this second fraction is also a criterium to qualitatively determine the diacylperoxide formation in the peroxides syntheses.

From the ratio between the $I^{st}$ fraction weight and the starting crude material weight, the conversion to diiodides (Conv.$_{Di}$) is obtained. The conversion to mono-iodides (Conv.$_{Mono}$) is calculated by the following formula:

$$\frac{A_o \times (weight_{crude\ material} - weight_{Ist\ fract.})}{Weight_{crude\ material}} \cdot 100 \qquad (I)$$

wherein $A_o$=ratio between the $^{19}F$ NMR peaks corresponding to the area of the monoiodinated end group ($A_{1-CF2I'}$), wherein I' is iodine or fluorine, and the sum between the area of the peak corresponding to the preceding group with that of the peak corresponding to the —$CF_2$—COOH ($A_{2-CF2COOH}$) end group, weight$_{crude\ material}$=grams of the reaction crude material, weight$_{Ist\ fract.}$=grams of the first fraction recovered from the column.

The conversion to PFPE with both acid end groups, when the compound is present, is calculated by applying the previous formula (I) wherein $A_o$ is, in this case, the ($A_{2-CF2COOH}$-$A_{1-CF2I'}$)/($A_{2-CF2COOH}$+$A_{2-CF2I'}$) ratio The yield of the halogenation reaction is obtained by multiplying the mass balance by the sum (Conv.$_{Di}$+Conv.$_{Mono}$). For the Z-PFPE derivatives the molecular weight of each of the two fractions obtained from the column (derivatives with both or only one end group substituted with an halogen atom) is calculated by applying the following formula IIa:

$$P \cdot M_{Z-PFPE} = \frac{T[(A_{c1} \times 66) + (A_{c2}/2 \times 116) + (A_{T1} \times P_{T1}) + (A_{T2} \times P_{T2}]}{A_{T1} + A_{T2}}$$

wherein:

$A_{c1}$=area of the $^{19}F$ NMR peak corresponding to the —$OCF_2$ group,

66=molecular weight of the —$OCF_2$ group, $A_{c2}$=area of the $^{19}F$ NMR peak corresponding to the $OCF_2$—$CF_2$— group, 116=molecular weight of the —$OCF_2$—$CF_2$— group, $A_{T1}$ and $A_{T2}$ are the areas of the $^{19}F$ NMR peaks corresponding to the two end groups. When we deal with a PFPE containing two end groups —$OCF2T^A$, wherein $T^A$ is the halogen, $A_{T2}$ is put equal to zero.

$P_{T1}$ and $P_{T2}$ are the molecular weights of the two end groups.

In case of a PFPE with two —$OCF2T^A$ end groups as above defined $P_{T1}$=molecular weight(1/2 Oxygen)+molecular weight (—$CF_2T^A$) wherein $T^A$ is the moelcular weight of the end group. In case of a PFPE containing only one end group —$CF_2T^A$ as above defined $A_{T2} \neq 0$ and $P_{T2}$=molecular weight (1/2 oxygen)+molecular weight (—$CF_2T^B$) wherein $T^B$ is the molecualr weight of the second end group (for example —COOH).

The average molecular weight of the mono and disubstituted derivative mixture is given from the following formula:

$$\text{Average } M.W. = \frac{A_{T2}}{A_{T1} + A_{T2}} monosubt.\ M.W. + \frac{A_{T1}}{A_{T1} + A_{T2}} disubst.M.W.$$

wherein monosubt. M.W. and disubst. M.W. refer respectively to the number average molecular weights of the mono- and di-halides as above defined.

In the Tables attached to the description the per cent conversions of di-iodide, monoiodide and of perfluoropolyether with both acid end groups have been calculated as above illustrated.

EXAMPLE 3
Synthesis of a Monoiodo-diiodo Mixture Z-PFPE MW 1437 with Iodine in Organic Solvent In a 250 ml reactor with magnetic stirring, dropping funnel and reflux 90 ml of perfluorohexane and 0.832 g of bisublimated iodine, corresponding to 3.28 mmoles, are introduced. The reactor is heated and thermostated at 55° C. At the time t=0, 13.2 ml of perfluorohexane solution containing 2.7 mmoles (3.7 g) of the compound obtained in Example 1, are added. The ratio between the iodine equivalents and those of the peroxidic end groups expressed as —$OCF_2COO$— groups is of 1.2. After 3 hours the reaction is stopped, filtered by using a paper-filter to eliminate the unreacted iodine and the solvent is evaporated at reduced pressure. 2.44 g of crude material are obtained. The mass balance is 99%. From the chromatographic column 0.927 g of diiodide are recovered. The conversion in di-iodide is of 38%. The internal percentage among the areas of the —$OCF_2I$ and —$OCF_2COOH$ peaks in the recovered fraction by eluting the column with the acid solution is respectively 54.5 and 45.5%. The conversion to PFPE having one —$OCF2I$ end group is 33.8%. The peroxide total conversion is 97%, the conversion to iodinated ZPFPE is of 71.8% and the yield 71.1%. in iodinated compounds (di+Mono).

EXAMPLE 4–5

The iodination reaction of Example 3 is repeated by using as solvents respectively a perfluoropolyether having perfluoroalkyl end groups (PFPE) having MW 800 and Freon® 113. The yield of iodinated products obtained in the two solvents were the following:

| Example | Solvent | Yield |
| --- | --- | --- |
| 4 | PFPE m.w. 800 | 97% |
| 5 | D100* | 98% |

*D100 is a mixture of perfluoraalkanes C7 and C8 in 30:70 ratio by weight.

EXAMPLE 6

Synthesis of a Polyacyl-peroxides Mixture Z-PFPE EW 529

The same equipment of Example 1 is used. 218.7 mmoles of NaOH dissolved in 59.1 ml of water are introduced in the flask. 87.5 mmoles of $H_2O_2$ at 57.5% and 100 ml of $C_6F_{14}$ are added to the solution. 72.9 mmoles of perfluoroether diacyl chloride Z-PFPE having MW=548.8 are dropped in the reaction mixture in 25 seconds. The reaction exothermy is controlled so that the temperature rising in the mixture is of +11° C. The $t_{max}$ is of 3.3 min. at 0° C. The mass is elaborated as described in Example 2. A product having average calculated EW 529 is obtained. The compound contains polyacylperoxides. The peroxide yield is 72%.

EXAMPLE 7

Synthesis of a Polyacyl-peroxides Mixture Z-PFPE with Average EW 2204

The same equipment of Example 1 is used. 54 mmoles of NaOH dissolved in 59.1 ml of water are introduced in the flask. 21.6 mmoles of $H_2O_2$ at 57.5% and 80 ml of a $C_6F_{14}$—$C_{10}F_{22}$ mixture are added to the solution. 18 mmoles of perfluoroether diacyl chloride Z-PFPE having MW=2223 are dropped into the reaction mixture in 15 seconds. The reaction exothermy is controlled so that the temperature increasing in the reaction mixture does not exceed +10° C. The $t_{max}$ results to be 3.5 min. at 0° C. The organic phase is recovered as described in Example 2. The peroxide yield is 71%.

EXAMPLE 8

Synthesis of the Diacyl Peroxides Z-PFPE with EW 4550

The equipment of Example 1 is used. 19.7 mmoles of NaOH dissolved in 5.32 ml of water are introduced in the flask. 7.88 mmoles of $H_2O_2$ at 57.5% and 60 ml of $C_6F_{14}$ are added to the solution. 6.57 mmoles of perfluoroether diacyl chloride Z-PFPE of formula (II) with T=COOH, having MW=4569 are dropped in the reaction mixture in 15 seconds. The reaction exothermy is controlled so that the temperature rising in the mixture is of +9° C. The $t_{max}$ is of 6 min. at 0° C. The organic phase is recovered as described in Example 2. 2 g of product, average EW 4550, are obtained. The peroxide yield is 24.3%.

EXAMPLE 9

Synthesis of Z PFPE with Monoiodo-$OCF_3$ End Groups, from Diacyl Peroxide Z PFPE with EW=4550

By proceeding as in Example 2A, in a reactor thermostated at 30° C., 20 g of diacylperoxide having EW=4550 (4.4 meq), 0.68 g of bisublimated $I_2$ (2.68 mmoles of $I_2$ corresponding to 5.36 mmoles of I, i.e. an excess of 1.2 with respect to the meq of diacyl peroxide, 60 ml of $C_6F_{14}$ are introduced and the reactants are allowed to react for 128 minutes (equal to 4 halflives of the diacylperoxide in reaction). When the reaction is over the unreacted iodine in excess is filtered and the solvent is evaporated. The procedure described in Example 2B for the products separation (Z PFPE with monoiodo/monoacid end groups from the one having both the end groups acid) is followed, by introducing the following change: the silica gel is not dispersed in an aqueous solution of acetic acid at 65% but the column is eluted with a 40/60 (v/v) methanol/acetic acid 65% mixture. The Z PFPE product having monoiodo/monoacid end groups elutes earlier than the diacid Z PFPE, with a 96% efficiency. By elution efficiency it is meant the eluate purity with respect to the total amount of the compound in column. 9.7 g with M.W. 4850 are separated. The conversion for this compound is 56% and the yield of 48.7%. The mixture analysis is reported in Table 1.

The product obtained with the preceding fractionation is dissolved in 10 ml of a fluorinated solvent formed by a $C_7F_{16}+C_8F_{18}$ mixture. The reactor is cooled at 0° C. and fluxed with $F_2$ diluted with $N_2$ diluted with $F_2/N_2$ 3/2 by volume and a 1 liter/hour flow-rate per 120 minutes. After the solvent evaporation, 9.5 g of Z PFPE with monoiodo/-$OCF_3$ end groups having MW 4825, are obtained. The conversion, yield and mass balance are quantitative and the obtained product is pure.

EXAMPLE 10–13

Reaction with Iodine of Polyacyl/diacylperoxides

The polyacyl/diacylperoxides obtained according to Examples 3, 6–8, are reacted with iodine under the same conditions as in Example 2.

In Table 1 the results of the analyses listed hereinafter carried out on the compounds obtained by treating with iodine the peroxides of the following examples are reported:

example 3 (ex. 10), example 7 (ex. 11), example 8 (ex. 12), example 6 (ex. 13).

example 9

And the following analyses:

Mass balance M.B. (see Example 2B),

Amount of the —$OCF_2I$ and —$OCF_2COOH$ groups in the reaction crude material, expressed as relative percentages determinmed by $^{19}$F-NMR, by considering equal to 100 the area obtained by summing up the one of the single peaks.

The per cent amounts of the di-iodinated (I/I), monoiodinated (I/X) and non iodinated compounds (X/X' wherein X and X' are —COOH) determined as described in Example 2.

EXAMPLE 14–17

Reaction with Bromine of the Polyacyl/diacilperoxides.

In Table 2 the results of the same analyses of Table 1 carried out on the compounds obtained by treating with bromine the peroxides obtained in the following examples, are summarized:

example 6 (ex. 14)

example 2 (ex. 15)

example 7 (ex. 16)

example 8 (ex. 17).

The bromination reaction with the peroxide of Example 6 (average E.W. 529) is described hereinafter. The same procedures have been applied to obtain the other brominated compounds of Table 2.

5.6 g of peroxide equal to 3.73 mmoles, corresponding to 14.92 mmoles of —OCF$_2$C(O)—O— end groups average EW 529 in 45 ml of C$_6$F$_{14}$ are added with 3 ml of bromine equal to 25.52 mmoles of Br$_2$. The molar excess of Bromine is of 3.4:1 with respect to the end groups. Under stirring it is allowed to react at 50° C. for 2.5 h. When the reaction is over the solvent is evaporated.

The crude material is subjected to chromatography as described in Example 2.

In the $^{19}$F NMR analysis the peaks of the —COOH group and those referred to the —OCF$_2$Br end group are considered (two triplets at −19.5 and −21.2 ppm respectively).

The parameters of the first column of Table 2 are the same as of the previous Table 1, wherefore the data of Table 2 are likewise interpreted.

EXAMPLE 18

Comparative

Synthesis of (per)fluorooolyethers Z-PFPE Having Iodinated End Groups with the Method Described in EP 348,948

In a 100 ml flask equipped with condenser, dropping funnel and magnetic stirrer 30 ml of a mixture 8:1:1 perfluorooctane:perfluorohexane:perfluorodecane, are introduced. 3.4 grams of iodine (13.4 mmoles) and 0.95 grams of Na$_2$CO$_3$ (8.9 mmoles) are added. It is heated with an oil bath to 90° C. Under stirring 10 g of Z PFPE diacylchloride m.w.=1000 are slowly added. It is allowed to react under stirring for 4 hours at 90° C., analysing the produced gases by FTIR and GC-MS. At the end of the reaction water is added and the organic phase is collected which is analysed by $^{19}$F NMR. The perfluoropolyether iodide yield (mono-+ di-iodide) resulted lower than 5%. The molecular weight of the obtained product resulted lower than that of the starting compound. The maian reaction is the decomposition (β scission or "zipping") of the perfluoropolyether chain with COF$_2$ release.

TABLE 1

Examples of peroxide iodination according to the invention process

|  | Ex. 10 | Ex. 11 | Ex. 12 | Ex. 13 | Ex. 9 |
|---|---|---|---|---|---|
| Average M.W. | 1437 | 2223 | 4569 | 518 | 4569 |
| Disubst. M.W. | 1525 | 2330 | 4714 | 610 | 4714 |
| Monosubst. M.W. | 1485 | 2210 | 4632 | 692 | 4825 |
| Mass Balance % | 99 | 92 | 87 | 89 | 84 |
| —OCF$_2$I* % | 54.9 | 73.2 | 28 | 48 | 28 |
| —OCF$_2$COOH* % | 45.1 | 26.8 | 72 | 28.4 | 72 |
| —I/-I$^{(1)}$ % | 38 | 46.4 | — | — | — |
| —I/-X$^{(2)}$ % | 33.8 | 53.6 | 56 | 11.5 | 56 |
| —X/-X'$^{(3)}$ % | 28.2 | — | 44 | 88.5 | 44 |
| —I/-X"$^{(4)}$ % |  |  |  |  | 54 |
| Conversion % | 71.8 | 100 | 56 | 52 | 54 |
| Yield % (di- + mono-) | 71.1 | 92 | 48.7 | 46.3 | 46.8 |

*internal percentage of the area of the $^{19}$F-NMR peaks of each group with respect to the total area of the group peaks (reaction crude material).
$^{(1)}$percentage of perfluoropolyether di-iodide.
$^{(2)}$percentage of perfluoropolyether mono-iodide.
$^{(3)}$percentage of perfluoropolyether with both end groups acid.
$^{(4)}$Percentage of perfluoropolyether with an iodinated end group and an —OCF$_3$ end group

TABLE 2

Examples of peroxides bromination according to the invention process.

|  | Ex. 14 | Ex. 15 | Ex. 16 | Ex. 17 |
|---|---|---|---|---|
| M.W. | 683.5 | 1713 | 2031 | 3746 |
| Mass Balance % | 91 | 87 | 89.3 | 95.6 |
| —OCF$_2$Br* % | 50.3 | 42.3 | 34.2 | 8 |
| —OCF$_2$COOH* % | 49.7 | 54.7 | 65.8 | 92 |
| —Br/-Br$^{(1)}$ % | 22 | 8.2 | 22 | — |
| —Br/-X$^{(2)}$ % | 56.6 | 70.7 | 24.4 | 16 |
| —X/-X$^{(3)}$ % (X = -COOH) | 21.4 | 21.1 | 53.6 | 84 |
| Conversion % | 78.6 | 78.9 | 46.4 | 16 |
| Yield % (di- + mono) | 71.5 | 68.6 | 41.4 | 15.3 |

*internal percentage of the area of the $^{19}$F-NMR peaks of each group with respect to the total area of the two group peaks (reaction crude material).
$^{(1)}$percentage of perfluoropolyether di-bromide.
$^{(2)}$percentage of perfluoropolyether di-bromide.
$^{(3)}$percentage of perfluoropolyether mono-bromide.
percentage of perfluoropolyether with both end groups acid (ex. 14–17).

What is claimed is:

1. A process for obtaining (per) fluoropolyethers substituted at one or at both end groups with a halogen atom selected from bromine or iodine, having the formula:

A—CF$_2$—O—(CF$_2$CF$_2$O)$_p$—(CF$_2$O)$_q$—CF$_2$—B   (III)

wherein

A=B=halogen; or A=halogen and B=COOH or F, and the halogen is I or Br;

p and q are integers such as to give a number average molecular weight (MW) in the range 350–5000 and the ratio p/q=0.5–2.0;

said process consisting of treating di- or poly-acylperoxides having an average equivalent weight in the range 350–5000, of formula:

T—CF$_2$—O—[(CF$_2$CF$_2$O)$_p$—(CF$_2$O)$_q$—CF$_2$—CO—O—O—CO—CF$_2$—(OCF$_2$)$_q$—(OCF$_2$CF$_2$)$_p$]$_y$—OCF$_2$—COOH   (II)

wherein:

y is an integer in the range 1–5;

p and q are integers such as to give the indicated EW of formula (II) and the ratio p/q=0.5–2.0;

T=COOH or F with the proviso that when T=COOH y=1–5, and when T=F then y=1 with a halogen selected from iodine or bromine, in a polyhalogenated organic solvent, at temperatures between 20° and 80° C.

2. A process according to claim 1, wherein the reaction time to prepare the halogenated compounds of formula (III) is comprised from 1 minute to 24 hours.

3. A process according to claim 1 wherein the temperatures and the reaction time are dependent upon the equivalent weight of the starting peroxide.

4. A process according to claim 3 wherein the peroxides of formula (II) have equivalent weights in the range 350–4000, the temperature is in the range 20°–55° C. and the reaction time ranges from 4 minutes to 10 hours.

5. A process according to claim 1, wherein the polyhalogenated organic solvents are:

perfluoropolyethers having a low molecular weight, in the range of 400–1000 having perfluoroalkylic end groups, each optionally containing, independently, one from the other, a hydrogen atom;

perfluoroalkanes having a $C_6$–$C_{10}$ linear chain, or mixtures thereof.

6. A process according to claim 1, wherein the ratio between halogen and peroxide, expressed as a ratio between the I or Br species moles and the peroxide moles ranges from 2:1 to 5:1.

7. A process according to claim 1, wherein the MW of the compounds of formula (III) is in the range of 500–2000.

8. A process according to claim 1, wherein by starting from the compounds of formula (II) with EW in the range 350–3000, perfluoropolyether mixtures having one or both end groups substituted with a halogen atom, are obtained.

9. A process according to claim 8, wherein from the mixtures obtained the di-halogen derivatives are isolated in a pure state by silica gel chromatography or other stationary phase capable of maintaining products having acid end groups.

10. A process according to claim 1, for obtaining di-iodinated alpha, omega (per)fluoropolyethers having the formula:

$$I-CF_2-O-(CF_2CF_2O)_p-(CF_2O)_q-CF_2-I \qquad (I)$$

by treating, at the indicated temperatures, compounds of formula (II) wherein y is an integer in the range of 2–5 with iodine; and wherein in formula I p and q are integers such as to give a molecular weight (MW) in the indicated range of 350–5000 and p/q ratio=0.5–2.0.

11. A process according to claim 1, wherein the temperature is comprised from 30° to 50° C., and the reaction time is comprised from 1 to 3 hours.

12. A process according to claim 6, wherein the ratio between halogen and peroxide ranges from 2:1 to 3:1.

* * * * *